US012577498B2

(12) United States Patent
Sikarskie et al.

(10) Patent No.: US 12,577,498 B2
(45) Date of Patent: Mar. 17, 2026

(54) FABRIC CARE FORMULATION

(71) Applicants: Dow Global Technologies LLC, Midland, MI (US); Dow Silicones Corporation, Midland, MI (US); Rohm and Haas Company, Collegeville, PA (US)

(72) Inventors: Michelle Sikarskie, Midland, MI (US); Randara Pulukkody, Lansdale, PA (US); Paula Bauer, Freeland, MI (US); Lyndsay M. Leal, Spring City, PA (US); Emmett M. Partain, III, Bound Brook, NJ (US); Daniel S. Miller, Phoenixville, PA (US); Jennifer P. Todd, Willow Grove, PA (US)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 233 days.

(21) Appl. No.: 18/261,714

(22) PCT Filed: Mar. 9, 2022

(86) PCT No.: PCT/US2022/019473

§ 371 (c)(1),
(2) Date: Jul. 17, 2023

(87) PCT Pub. No.: WO2022/203868

PCT Pub. Date: Sep. 29, 2022

(65) Prior Publication Data

US 2024/0150674 A1 May 9, 2024

Related U.S. Application Data

(60) Provisional application No. 63/164,610, filed on Mar. 23, 2021.

(51) Int. Cl.

| | |
|---|---|
| ***C11D 1/831*** | (2006.01) |
| ***C11D 1/22*** | (2006.01) |
| ***C11D 1/29*** | (2006.01) |
| ***C11D 3/22*** | (2006.01) |

(52) U.S. Cl.
CPC ................ *C11D 1/831* (2013.01); *C11D 1/22* (2013.01); *C11D 1/29* (2013.01); *C11D 3/222* (2013.01); *C11D 2111/12* (2024.01)

(58) Field of Classification Search
CPC .. C11D 1/831; C11D 1/22; C11D 1/29; C11D 3/222; C11D 2111/12; C11D 3/3788; C11D 1/62
See application file for complete search history.

(56) References Cited

U.S. PATENT DOCUMENTS

| | | | | |
|---|---|---|---|---|
| 4,308,024 | A | 12/1981 | Wells | |
| 4,411,891 | A | 10/1983 | Mizutani et al. | |
| 6,492,322 | B1 | 12/2002 | Cooper et al. | |
| 6,833,347 | B1 | 12/2004 | Wang et al. | |
| 7,012,053 | B1 | 3/2006 | Barnabas et al. | |
| 7,528,101 | B2 | 5/2009 | Carvell et al. | |
| 7,589,051 | B2 | 9/2009 | Erazo-Majewicz et al. | |
| 10,604,723 | B2 | 3/2020 | Eldredge et al. | |
| 2017/0335242 | A1 | 11/2017 | Eldredge et al. | |
| 2018/0010070 | A1 * | 1/2018 | Zhang .................... | C11D 3/222 |
| 2023/0100700 | A1 * | 3/2023 | Pulukkody ............. | C11D 3/227 510/329 |

FOREIGN PATENT DOCUMENTS

| | | | | |
|---|---|---|---|---|
| EP | 1960590 | * | 1/2013 | |
| EP | 1960590 B1 | * | 1/2013 | ............ D06M 15/61 |
| WO | 2016160738 | | 10/2016 | |

OTHER PUBLICATIONS

Mishra, "Ester Quats: The Novel Class of Cationic Fabric Softeners", Journal of Oleo Science, 2007, pp. 269-276, vol. 56, No. 6, Japan Oil Chemists Society, JP.
Sibilia, "A Guide to Materials Characterization and Chemical Analysis", VCH, 1988, pp. 81-84.
Weston, "Ammonium Compounds", Kirk-Othmer Encyclopedia of Chemical Technology, 2003, pp. 1-52, 4th ed., Wiley-Interscience, USA.
Yau, "Modern Size Exclusion Chromatography", Wiley-Interscience, 1979.

* cited by examiner

*Primary Examiner* — Cephia D Toomer
(74) *Attorney, Agent, or Firm* — Thomas S. Deibert

(57) ABSTRACT

A fabric care formulation is provided including water; an esterquat and a deposition aid polymer, wherein the deposition aid polymer is a dextran polymer functionalized with quaternary ammonium moieties.

9 Claims, No Drawings

FABRIC CARE FORMULATION

The present invention relates to a fabric care formulation. In particular, the present invention relates to a fabric care formulation comprising: water; an esterquat; and a deposition aid polymer, wherein the deposition aid polymer is a dextran polymer functionalized with quaternary ammonium moieties.

Use of cationic carbohydrate polymers in laundry detergents is known, as in, e.g., U.S. Pat. No. 6,833,347. However, this reference does not suggest the use of the modified polymers described herein.

A modified carbohydrate polymer having quaternary ammonium groups has been disclosed for use in fabric care by Eldredge, et al. in U.S. Patent Application Publication No. 20170335242. Eldredge, et al disclose a fabric care composition comprising a modified carbohydrate polymer having quaternary ammonium groups having at least one $C_{8-22}$ alkyl or alkenyl group; wherein the modified carbohydrate polymer has a weight-average molecular weight of at least 500,000; and wherein at least 20 wt % of the quaternary ammonium groups on the at least one modified carbohydrate polymer have at least one $C_{8-22}$ alkyl or alkenyl group.

Notwithstanding, there remains a continuing need for fabric care formulations having a desirable balance of performance properties, including fabric softening properties. There is also a continuing need for new fabric care formulations having an increased natural origin index (ISO16128) when compared with conventional fabric care formulations.

The present invention provides a fabric care formulation comprising: water; an esterquat; and a deposition aid polymer, wherein the deposition aid polymer is a dextran polymer functionalized with quaternary ammonium moieties.

The present invention provides a method of treating an article of laundry, comprising: providing an article of laundry; selecting a fabric care formulation according to the present invention; providing a bath water; and applying the bath water and the fabric care formulation to the article of laundry to provide a treated article of laundry.

DETAILED DESCRIPTION

It has been found that a fabric care formulation including a combination of (preferably a synergistic combination of) an esterquat and a deposition aid polymer comprising a dextran polymer functionalized with quaternary ammonium moieties provides a surprisingly favorable balance of performance properties including fabric softening.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polyethylene glycol standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

Preferably, the fabric care formulation of the present invention is selected from the group consisting of a fabric refresher formulation, a fabric softening formulation and a laundry detergent formulation. Preferably, the fabric care formulation of the present invention is a fabric softening formulation.

Preferably, the fabric care formulation of the present invention, comprises: water (preferably, 10 to 99.85 wt % (more preferably, 25 to 98.925 wt %; most preferably, 50 to 94.9 wt %), based on the weight of the fabric care formulation, of water); an esterquat (preferably, 0.1 to 30 wt % (more preferably, 1 to 25 wt %; most preferably, 5 to 20 wt %), based on the weight of the fabric care formulation, of the esterquat); a deposition aid polymer (preferably, 0.05 to 5.0 wt %; more preferably, 0.075 to 4.0 wt %; most preferably, 0.1 to 3 wt %), based on the weight of the fabric care formulation, of the deposition aid polymer), wherein the deposition aid polymer is a dextran polymer (preferably, a branched chain dextran polymer) functionalized with quaternary ammonium moieties (preferably, wherein the deposition aid polymer has a Kjeldahl nitrogen content corrected for ash and volatiles, TKN, of ≥0.5 wt % (preferably, 0.5 to 5.0 wt %; more preferably, 0.5 to 4.0 wt %; still more preferably, 0.75 to 2.5 wt %; most preferably, 1 to 2 wt %) (preferably, wherein the esterquat and the deposition aid polymer synergistically enhance softness of a treated fabric) (preferably, the fabric care formulation of the present invention contains a synergistic combination of the esterquat and the deposition aid polymer)(preferably, wherein the fabric is selected from the group consisting of cotton interlock, cotton, poly cotton blend and cotton terry; more preferably, wherein the fabric contains cotton; most preferably, wherein the fabric is cotton).

Preferably, the fabric care formulation of the present invention is a liquid formulation. More preferably, the fabric care formulation of the present invention is an aqueous liquid formulation.

Preferably, the fabric care formulation of the present invention, comprises: 10 to 99.85 wt % (preferably, 25 to 98.925 wt %; most preferably, 50 to 94.9 wt %), based on the weight of the fabric care formulation, of water. More preferable, the fabric care formulation of the present invention, comprises: 10 to 99.85 wt % (preferably, 25 to 98.925 wt %; most preferably, 50 to 94.9 wt %), based on the weight of the fabric care formulation, of water, wherein the water is at least one of distilled water and deionized water. Most preferably, the fabric care formulation of the present invention, comprises: 10 to 99.85 wt % (preferably, 25 to 98.925 wt %; most preferably, 50 to 94.9 wt %), based on the weight of the fabric care formulation, of water, wherein the water is distilled and deionized.

Preferably, the fabric care formulation of the present invention, further comprises: 0.1 to 30 wt % (preferably, 1 to 25 wt %; most preferably, 5 to 20 wt %), based on weight of the fabric care formulation, of an esterquat. More preferably, the fabric care formulation of the present invention, comprises: 0.1 to 30 wt % (preferably, 1 to 25 wt %; most preferably, 5 to 20 wt %), based on weight of the fabric care formulation, of an esterquat; wherein the esterquat is a compound comprising a cationic nitrogen ($N^+$) atom, at least one fatty carbon chain containing 4 to 36 carbon atoms, and at least one ester function. The fatty carbon chain may optionally comprise hetero atoms other than carbon atoms (e.g., Si atoms). The cationic nitrogen atom may be linked to the at least one fatty carbon chain via ester functions, for example via: $-(CH_2)_a-O-C(=O)-$ chains in which a is 0 to 5 and/or $=C(-O-C(=O)-(CH_2)_b-CH_3)_2$ in which b is 4 to 36. Various types of esterquats may be suitable for use in the fabric care formulations of the present invention, including, for example, monoesterquats (EQ), triester-quaternary ammonium compounds (TEQ) and diester-quaternary ammonium compounds (DEQ). These compounds may also comprise a mixture of mono-(I), di-(II) and tri-(III) ester components. Preferably, the esterquat is a partially hydrogenated palm esterquat.

Preferably, the fabric care formulation of the present invention comprises a deposition aid polymer; wherein the deposition aid polymer is a dextran polymer functionalized with quaternary ammonium moieties; wherein the deposition aid polymer in combination with the esterquat enhances softness of a treated fabric (preferably, wherein the esterquat and the deposition aid polymer synergistically enhance softness of a treated fabric)(preferably, wherein the fabric is selected from the group consisting of cotton interlock, cotton, poly cotton blend and cotton terry; more preferably, wherein the fabric contains cotton; most preferably, wherein the fabric is cotton). More preferably, the fabric care formulation of the present invention comprises 0.05 to 5.0 wt % (preferably, 0.075 to 4.0 wt %; more preferably, 0.1 to 3 wt %), based on weight of the fabric care formulation, of a deposition aid polymer; wherein the deposition aid polymer is a dextran polymer functionalized with quaternary ammonium moieties; wherein the deposition aid polymer in combination with the esterquat enhances softness of a treated fabric (preferably, wherein the esterquat and the deposition aid polymer synergistically enhance softness of a treated fabric)(preferably, wherein the fabric is selected from the group consisting of cotton interlock, cotton, poly cotton blend and cotton terry; more preferably, wherein the fabric contains cotton; most preferably, wherein the fabric is cotton). Most preferably, the fabric care formulation of the present invention comprises 0.05 to 5.0 wt % (preferably, 0.075 to 4.0 wt %; more preferably, 0.1 to 3 wt %), based on weight of the fabric care formulation, of a deposition aid polymer; wherein the deposition aid polymer is a dextran polymer functionalized with quaternary ammonium moieties; wherein the deposition aid polymer has a Kjeldahl nitrogen content corrected for ash and volatiles, TKN, of ≥0.5 wt % (preferably, 0.5 to 5.0 wt %; more preferably, 0.5 to 4.0 wt %; still more preferably, 0.75 to 2.5 wt %; most preferably, 1 to 2 wt %)(measured using a Buchi KjelMaster K-375 automated analyzer, corrected for volatiles and ash measured as described in ASTM method D-2364); wherein the deposition aid polymer in combination with the esterquat enhances softness of a treated fabric (preferably, wherein the esterquat and the deposition aid polymer synergistically enhance softness of a treated fabric)(preferably, wherein the fabric is selected from the group consisting of cotton interlock, cotton, poly cotton blend and cotton terry; more preferably, wherein the fabric contains cotton; most preferably, wherein the fabric is cotton).

Preferably, the deposition aid polymer is a dextran polymer functionalized with quaternary ammonium moieties; wherein the dextran polymer has a weight average molecular weight of 50,000 to 3,000,000 Daltons (preferably, 100,000 to 2,000,000 Daltons; more preferably, 125,000 to 1,000,000 Daltons; still more preferably, 130,000 to 650,000 Daltons; most preferably, 145,000 to 525,000 Daltons). More preferably, the deposition aid polymer is a dextran polymer functionalized with quaternary ammonium moieties; wherein the dextran polymer has a weight average molecular weight of 50,000 to 3,000,000 Daltons (preferably, 100,000 to 2,000,000 Daltons; more preferably, 125,000 to 1,000,000 Daltons; still more preferably, 130,000 to 650,000 Daltons; most preferably, 145,000 to 525,000 Daltons); and wherein the dextran polymer is a branched chain dextran polymer comprising a plurality of glucose structural units; wherein 90 to 98 mol % (preferably, 92.5 to 97.5 mol %; more preferably, 93 to 97 mol %; most preferably, 94 to 96 mol %) of the glucose structural units are connected by α-D-1,6 linkages and 2 to 10 mol % (preferably, 2.5 to 7.5 mol %; more preferably, 3 to 7 mol %; most preferably, 4 to 6 mol %) of the glucose structural units are connected by α-1,3 linkages. Most preferably, the deposition aid polymer is a dextran polymer functionalized with quaternary ammonium moieties; wherein the dextran polymer has a weight average molecular weight of 50,000 to 3,000,000 Daltons (preferably, 100,000 to 2,000,000 Daltons; more preferably, 125,000 to 1,000,000 Daltons; still more preferably, 130,000 to 650,000 Daltons; most preferably, 145,000 to 525,000 Daltons); wherein the dextran polymer is a branched chain dextran polymer comprising a plurality of glucose structural units; wherein 90 to 98 mol % (preferably, 92.5 to 97.5 mol %; more preferably, 93 to 97 mol %; most preferably, 94 to 96 mol %) of the glucose structural units are connected by α-D-1,6 linkages and 2 to 10 mol % (preferably, 2.5 to 7.5 mol %; more preferably, 3 to 7 mol %; most preferably, 4 to 6 mol %) of the glucose structural units are connected by α-1,3 linkages according to formula I

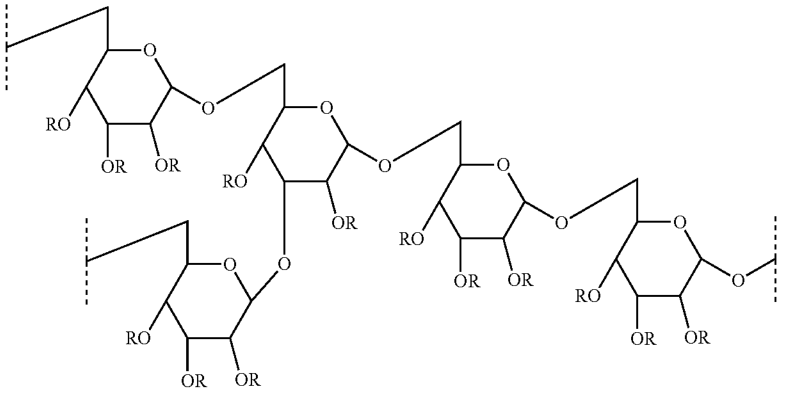

(I)

wherein R is selected from a hydrogen, a $C_{1-4}$ alkyl group and a hydroxy $C_{1-4}$ alkyl group; and wherein the average branch off the dextran polymer backbone is ≤3 anhydroglucose units.

Preferably, the dextran polymer contains less than 0.01 wt %, based on weight of the dextran polymer, of alternan. More preferably, the dextran polymer contains less than 0.001 wt %, based on weight of the dextran polymer, of alternan. Most preferably, the dextran polymer contains less than the detectable limit of alternan.

Preferably, the deposition aid polymer is a dextran polymer functionalized with quaternary ammonium moieties; wherein the quaternary ammonium moieties are of formula (A) bound to a pendant oxygen on the dextran polymer (A)

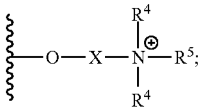

wherein

is a pendant oxygen on the dextran polymer; wherein X is a divalent linking group bonding the quaternary ammonium moiety to the pendent oxygen on the dextran polymer (preferably, wherein X is selected from divalent hydrocarbon groups, which may optionally be substituted (e.g., with a hydroxy group, an alkoxy group, an ether group); more preferably, wherein X is a $—CH_2CH(OR^6)CH_2—$ group; wherein $R^6$ is selected from the group consisting of a hydrogen and a $C_{1-4}$ alkyl group (preferably, a hydrogen); most preferably, X is a $—CH_2CH(OH)CH_2—$ group); wherein each $R^4$ is independently selected from the group consisting of a $C_{1-7}$ alkyl group (preferably, a $C_{1-3}$ alkyl group; more preferably, a methyl group and an ethyl group; most preferably, a methyl group); and wherein $R^5$ is selected from the group consisting of a $C_{1-22}$ alkyl group (preferably, selected from the group consisting of a $C_{1-3}$ alkyl group and a $C_{6-22}$ alkyl group; more preferably, a methyl group and an ethyl group; most preferably, a methyl group). More preferably, the deposition aid polymer is a cationic dextran polymer; wherein the cationic dextran polymer, comprises a dextran polymer functionalized with quaternary ammonium groups; wherein the quaternary ammonium groups are selected from the group consisting of quaternary ammonium moieties of formula (B) bound to a pendent oxygen on the dextran polymer (B)

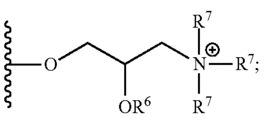

wherein $R^6$ is selected from the group consisting of a hydrogen and a $C_{1-4}$ alkyl group (preferably, a hydrogen); and wherein each $R^7$ is independently selected from the group consisting of a methyl group and an ethyl group (preferably, a methyl group).

Preferably, the deposition aid polymer comprises <0.001 meq/gram (preferably, <0.0001 meq/gram; more preferably, <0.00001 meq/gram; most preferably, <detectable limit) of aldehyde functionality.

Preferably, the deposition aid polymer comprises <0.1% (preferably, <0.01%; more preferably, <0.001%; most preferably, <detectable limit), of the linkages between individual glucose units in the deposition aid polymer are β-1,4 linkages.

Preferably, the deposition aid polymer comprises <0.1% (preferably, <0.01%; more preferably, <0.001%; most preferably, <detectable limit), of the linkages between individual glucose units in the deposition aid polymer are β-1,3 linkages.

Preferably, the deposition aid polymer comprises <0.001 meq/gram (preferably, <0.0001 meq/gram; more preferably, <0.00001 meq/gram; most preferably, <detectable limit) of silicone containing functionality.

Preferably, the fabric care formulation of the present invention, optionally further comprises a fragrance. More preferably, the fabric care formulation of the present invention, further comprises: 0.05 to 10 wt % (preferably, 0.1 to 5 wt %; most preferably, 0.1 to 3 wt %), based on weight of the fabric care formulation, of fragrance. Still more preferably, the fabric care formulation of the present invention, optionally further comprises: 0.05 to 10 wt % (preferably, 0.1 to 5 wt %; most preferably, 0.1 to 3 wt %), based on weight of the fabric care formulation, of fragrance; wherein the fragrance is selected from the group consisting of benzyl alcohol, citronellol, linalool, limonene and mixtures thereof. Most preferably, the fabric care formulation of the present invention, optionally further comprises: 0.05 to 10 wt % (preferably, 0.1 to 5 wt %; most preferably, 0.1 to 3 wt %), based on weight of the fabric care formulation, of fragrance; wherein the fragrance includes citronellol.

Preferably, the fabric care formulation of the present invention, optionally further comprises: a cleaning surfactant. More preferably, the fabric care formulation of the present invention, optionally further comprises: 0 to 89.9 wt % (preferably, 5 to 75 wt %; more preferably, 10 to 60 wt %; most preferably, 15 to 30 wt %), based on the weight of the fabric care formulation, of a cleaning surfactant. Still more preferably, the fabric care formulation of the present invention, optionally further comprises: 5 to 89.9 wt % (preferably, 5 to 75 wt %; more preferably, 10 to 60 wt %; most preferably, 15 to 30 wt %), based on the weight of the fabric care formulation, of a cleaning surfactant; wherein the cleaning surfactant is selected from the group consisting of anionic surfactants, nonionic surfactants, cationic surfactants, amphoteric surfactants and mixtures thereof. Yet still more preferably, the fabric care formulation of the present invention, optionally further comprises: 5 to 89.9 wt % (preferably, 5 to 75 wt %; more preferably, 10 to 60 wt %; most preferably, 15 to 30 wt %), based on the weight of the fabric care formulation, of a cleaning surfactant; wherein the cleaning surfactant is selected from the group consisting of a mixture including an anionic surfactant and a non-ionic surfactant. Most preferably, the fabric care formulation of the present invention, optionally further comprises: 5 to 89.9 wt % (preferably, 5 to 75 wt %; more preferably, 10 to 60 wt %; most preferably, 15 to 30 wt %), based on the weight of the fabric care formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate and mixtures thereof.

Non-ionic surfactants include secondary alcohol ethoxylates, ethoxylated 2-ethylhexanol, ethoxylated seed oils, butanol caped ethoxylated 2-ethylhexanol and mixtures thereof. Preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodinium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

The fabric care formulation of the present invention optionally further comprises an additive selected from the group consisting of builders (e.g., sodium citrate), hydrotropes (e.g., ethanol, propylene glycol), enzymes (e.g., protease, lipase, amylase), preservatives, fluorescent whitening agents, dyes, additive polymers, rheology modifiers, suspension agents, other fabric softening agents and mixtures thereof.

Preferably, the fabric care formulation of the present invention further comprises: 0 to 10 wt % (preferably, 1 to 10 wt %; more preferably, 2 to 8 wt %; most preferably, 5 to 7.5 wt %), based on the weight of the fabric care formulation, of a hydrotrope. More preferably, the fabric care formulation of the present invention further comprises: 0 to 10 wt % (preferably, 1 to 10 wt %; more preferably, 2 to 8 wt %; most preferably, 5 to 7.5 wt %), based on the weight of the fabric care formulation, of a hydrotrope; wherein the hydrotrope is selected from the group consisting of alkyl hydroxides; glycols, urea; monoethanolamine; diethanolamine; triethanolamine; calcium, sodium, potassium, ammonium and alkanol ammonium salts of xylene sulfonic acid, toluene sulfonic acid, ethylbenzene sulfonic acid and cumene sulfonic acid; salts thereof and mixtures thereof. Still more preferably, the fabric care formulation of the present invention further comprises: 0 to 10 wt % (preferably, 1 to 10 wt %; more preferably, 2 to 8 wt %; most preferably, 5 to 7.5 wt %), based on the weight of the fabric care formulation, of a hydrotrope; wherein the hydrotrope is selected from the group consisting of ethanol, propylene glycol, sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof. Yet still more preferably, the fabric care formulation of the present invention further comprises: 0 to 10 wt % (preferably, 1 to 10 wt %; more preferably, 2 to 8 wt %; most preferably, 5 to 7.5 wt %), based on the weight of the fabric care formulation, of a hydrotrope; wherein the hydrotrope includes at least one of ethanol, propylene glycol and sodium xylene sulfonate. Most preferably, the fabric care formulation of the present invention further comprises: 0 to 10 wt % (preferably, 1 to 10 wt %; more preferably, 2 to 8 wt %; most preferably, 5 to 7.5 wt %), based on the weight of the fabric care formulation, of a hydrotrope; wherein the hydrotrope is a mixture of ethanol, propylene glycol and sodium xylene sulfonate.

Preferably, the fabric care formulation of the present invention further comprises: 0 to 30 wt % (preferably, 0.1 to 15 wt %; more preferably, 1 to 10 wt %), based on the weight of the fabric care formulation, of a builder. More preferably, the fabric care formulation of the present invention further comprises: 0 to 30 wt % (preferably, 0.1 to 15 wt %; more preferably, 1 to 10 wt %), based on the weight of the fabric care formulation, of a builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylene-phosphonic acid; salts of ethylenediaminetetraethylene-phosphonic acid; oligomeric phosphonates; polymeric phosphonates; mixtures thereof. Most preferably, the fabric care formulation of the present invention further comprises: 0 to 30 wt % (preferably, 0.1 to 15 wt %; more preferably, 1 to 10 wt %), based on the weight of the fabric care formulation, of a builder; wherein the builder includes a citrate (preferably, a sodium citrate).

The present invention provides a method of treating an article of laundry, comprising: providing an article of laundry; providing a fabric care formulation of the present invention; providing a bath water; and applying the bath water and the fabric care formulation to the article of laundry (preferably, wherein the article of laundry is a fabric selected from the group consisting of cotton interlock, cotton, poly cotton blend and cotton terry; more preferably, wherein the fabric contains cotton; most preferably, wherein the fabric is cotton) to provide a treated article of laundry. More preferably, the present invention provides a method of treating an article of laundry, comprising: providing an article of laundry (preferably, wherein the article of laundry is a fabric selected from the group consisting of cotton interlock, cotton, poly cotton blend and cotton terry; more preferably, wherein the fabric contains cotton; most preferably, wherein the fabric is cotton); providing a fabric care formulation of the present invention; providing a bath water; and applying the bath water and the fabric care formulation to the article of laundry to provide a treated article of laundry;

wherein the deposition aid polymer in combination with the esterquat enhances softness of the treated article of laundry (preferably, wherein the esterquat and the deposition aid polymer synergistically enhance softness of the treated article of laundry)(preferably, wherein the article of laundry is selected from the group consisting of cotton interlock, cotton, poly cotton blend and cotton terry; more preferably, wherein the article of laundry contains cotton; most preferably, wherein the article of laundry is cotton).

Some embodiments of the present invention will now be described in detail in the following Examples.

The modified carbohydrate polymers in the Examples were characterized as follows.

The volatiles and ash content (measured as sodium chloride) were determined as described in ASTM method D-2364.

The total Kjeldahl nitrogen content (TKN) was determined in duplicate using a Buchi KjelMaster K-375 automatic Kjeldahl analyzer. The TKN values were corrected for volatiles and ash.

Example S1: Synthesis of Cationic Dextran Polymer

A 500 mL, four necked, round bottom flask fitted with a rubber septum cap, a nitrogen inlet, a pressure equalizing addition funnel, a stirring paddle and motor, a subsurface thermocouple connected to a J-KEM controller and a Friedrich condenser connected to a mineral oil bubbler was charged with dextran (30.33 g; Aldrich product #D4876) and deionized water (160.75 g). The addition funnel was charged with a 70% aqueous solution of 2,3-epoxypropyltrimethylammonium chloride (27.13 g; QUAB® 151 available from SKW QUAB Chemicals). The flask contents were allowed to stir until the dextran dissolved in the deionized water. While the contents were stirring, the apparatus was purged with nitrogen to displace any oxygen entrained in the system. The nitrogen flow rate was about 1 bubble per second. The mixture was purged with nitrogen while stirring for one hour. Using a plastic syringe, a 25% aqueous sodium hydroxide solution (4.76 g) was added over a period of a few minutes to the flask contents with stirring under nitrogen. The flask contents were then allowed to stir under nitrogen for 30 minutes. The contents of the addition funnel were then charged to the flask contents dropwise over a few minutes under nitrogen with continued stirring. After the contents of the addition funnel were transferred to the flask contents, the mixture was allowed to stir for 5 minutes. Then heat was applied to the flask contents with a heating mantle controlled using the J-KEM controller set at 55° C. The flask contents were heated to and maintained at 55° C. for 90 minutes. The flask contents were then cooled to room temperature while maintaining a positive nitrogen pressure in the flask. When the flask contents reached room temperature, acetic acid (2.50 g) was added dropwise to the flask contents via a syringe and the flask contents were stirred for 5 minutes. The polymer was recovered by non-solvent precipitation of the aqueous solution with an excess of methanol. The precipitated cationic dextran polymer was then recovered by filtration through a Buchner funnel and dried overnight in vacuo at 50° C. The product branched chain cationic dextran polymer was an off-white solid (24.3 g), with a volatiles content of 3.65%, an ash content of 0.37% (as sodium chloride). The volatiles and ash were measured as described in ASTM method D-2364. The Kjeldahl nitrogen content was measured using a Buchi KjelMaster K-375 automated analyzer and was found to be 1.41% (corrected for volatiles and ash), which corresponds to a trimethylammonium degree of substitution, CS, of 0.19. The weight average molecular weight, Mw, of the product cationic dextran polymer was 1,820,000 Daltons.

Comparative Examples CF1-CF4 and Example F1: Fabric Care Formulation

Fabric care formulations were prepared in each of Comparative Examples CF1-CF4 and Example F1 having the formulation as described in Table 1 and prepared by standard laundry formulation preparation procedure.

TABLE 1

| Ingredient | CF1 | CF2 | CF3 (wt %) | CF4 | F1 |
|---|---|---|---|---|---|
| Methyl bis[ethyl(tallowate)]-2-hydroxyethyl ammonium methyl sulfate[1] | 5.6 | 0 | 5.6 | 5.6 | 5.6 |
| Cationic emulsion of high molecular weight aminosilicone[2] | 0 | 0 | 3.42 | 3.4 | 0 |
| Example S1 | 0 | 2 | 0 | 1 | 2 |
| Deionized water | | | q.s. 100 | | |

[1]Stepantex ® VK-90 available from Stepan Company

[2]DOWSIL ™ FM-6620 emulsion available from The Dow Chemical Company

Fabric Softness

Fabric softening performance of the fabric care formulations of Comparative Examples CF1-CF4 and Example F1 were assessed in a Kenmore top load washing machine on the Normal/Regular setting with a medium load setting and a temperature set to 70° F. Generic laundry detergent (32.2 g) was added for the wash cycle and the fabric care formulation of Comparative Example CF1-CF4 or Example F1 (25 g) was added at the beginning of the rinse cycle. Fabric articles treated in each test consisted of two cotton terry washcloths and ballast to bring the total load weight up to six pounds. Once the washing machine cycle was complete, the full ballast was removed from the washing machine and tumble dried on high heat until dry. Prior to analysis, the cotton terry washcloths were conditioned in a temperature and humidity chamber at 21° C. and 65% relative humidity for 24 hours. After conditioning, at least four swatches from each cotton terry washcloth were analyzed using a Phabrometer® system to evaluate softness. The results are proved in Tables 2-3.

TABLE 2

| Fabric care formulation | Mean Phabrometer Score |
|---|---|
| Comp. Ex. CF1 | 75.7 |
| Comp. Ex. CF2 | 75.3 |
| Example F1 | 76.5 |

TABLE 3

| Fabric care formulation | Mean Phabrometer Score |
|---|---|
| Comp. Ex. CF1 | 74.5 |
| Comp. Ex. CF3 | 75.2 |
| Comp. Ex. CF4 | 75.8 |
| Example F1 | 76.3 |

We claim:

1. A fabric care formulation comprising:

water;

an esterquat; and a deposition aid polymer, wherein the deposition aid polymer is a dextran polymer functionalized with quaternary ammonium moieties; wherein the dextran polymer is a branched chain dextran polymer comprising a plurality of glucose structural units; wherein 90 to 98 mol % of the glucose structural units are connected by α-D-1,6 linkages and 2 to 10 mol % of the glucose structural units are connected by α-1,3 linkages.

2. The fabric care formulation of claim 1, further comprising a fragrance.

3. The fabric care formulation of claim 2, wherein the fragrance is selected from the group consisting of benzyl alcohol, citronellol, linalool, limonene and mixtures thereof.

4. The fabric care formulation of claim 3, wherein the deposition aid polymer has a Kjeldahl nitrogen content corrected for ash and volatiles of 0.5 to 5.0 wt %.

5. The fabric care formulation of claim 4, wherein the dextran polymer has a weight average molecular weight of 50,000 to 3,000,000 Daltons.

6. The fabric care formulation of claim 5, wherein the fabric care formulation is a laundry detergent further comprising a cleaning surfactant.

7. The laundry detergent of claim 6, wherein the cleaning surfactant is selected from the group consisting of anionic surfactants, nonionic surfactants, cationic surfactants, amphoteric surfactants and mixtures thereof.

8. The laundry detergent of claim 7, wherein the cleaning surfactant includes a mixture of a linear alkyl benzene sulfonate, a sodium lauryl ethoxysulfate and a nonionic alcohol ethoxylate.

9. A method of treating an article of laundry, comprising: providing an article of laundry; selecting a fabric care formulation according to claim 1; providing a bath water; and applying the bath water and the fabric care formulation to the article of laundry to provide a treated article of laundry.

* * * * *